United States Patent [19]

Gross

[11] 4,018,908
[45] Apr. 19, 1977

[54] VACUUM TREATMENT TO REMOVE VAPORIZED LIQUID FROM UNFROZEN CELLULAR SUBSTANCES WHILE KEEPING THE CELL WALLS THEREOF INTACT

[76] Inventor: George E. Gross, 16601 Jean Lane, Tinley Park, Ill. 60477

[22] Filed: Apr. 18, 1974

[21] Appl. No.: 461,839

Related U.S. Application Data

[63] Continuation of Ser. No. 221,503, Jan. 28, 1972, abandoned.

[52] U.S. Cl. .............................. 426/281; 426/310; 426/455
[51] Int. Cl.² .......................................... A23L 1/31
[58] Field of Search ......... 426/281, 302, 310, 312, 426/313, 319, 321, 323, 327, 328, 335, 377, 378, 384, 385, 418, 419, 438–441, 478, 486, 639, 443, 455, 472; 71/68; 117/3; 21/58; 47/58; 34/5; 62/58; 427/4

[56] References Cited

UNITED STATES PATENTS

| | | | |
|---|---|---|---|
| 2,344,151 | 3/1944 | Kasser | 426/524 |
| 2,420,517 | 5/1947 | Brandner | 426/639 |
| 2,658,836 | 11/1953 | Fessenden | 427/4 |
| 2,698,809 | 1/1955 | Fessenden | 427/4 |
| 3,261,694 | 7/1966 | Forkner | 426/438 |
| 3,335,015 | 8/1967 | Forkner | 426/438 |
| 3,408,208 | 10/1968 | Lamb | 426/444 |
| 3,467,530 | 9/1969 | Scharschmidt | 426/385 |
| 3,718,485 | 2/1973 | Lankford | 426/438 |
| 3,821,449 | 6/1974 | Swisher | 426/438 |

*Primary Examiner*—Norman Yudkoff
*Assistant Examiner*—Martin G. Mullen
*Attorney, Agent, or Firm*—Michael Kovac

[57] ABSTRACT

Unfrozen cellular substances are conditioned by a reduced pressure environment for subsequent processing. Cellular liquid is vaporized from the unfrozen cellular substance by a combination of reduced pressure and temperature control at a rate which is not greater than the vapor transmission rate of the rupturable cell walls of said cellular substance in order to remove said vaporized cellular liquid while keeping the cell walls intact.

3 Claims, 5 Drawing Figures

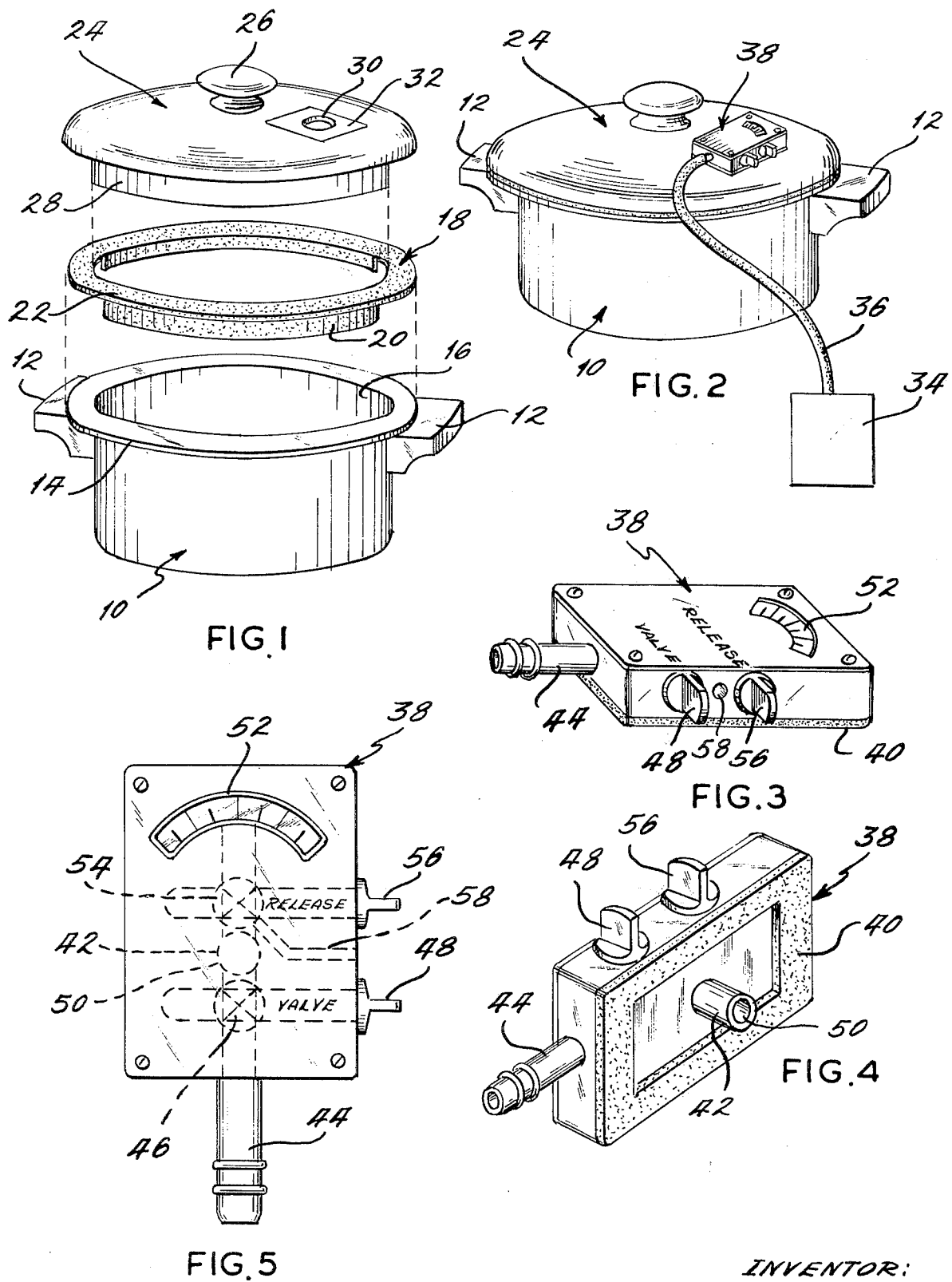

VACUUM TREATMENT TO REMOVE VAPORIZED LIQUID FROM UNFROZEN CELLULAR SUBSTANCES WHILE KEEPING THE CELL WALLS THEREOF INTACT

This application is a continuation of my prior U.S. application Ser. No. 221,503 filed on Jan. 28, 1972 and now abandoned.

SUMMARY OF THE INVENTION

The present invention discloses a technique for treating cellular substances so as to control fluid penetration of the cells, rupture of the cells, and fluid impregnation between the cells where there are spaces between the cells, some or all of which may be desired for the particular treatment that is contemplated. While there are numerous applications for the herein disclosed technique, it has been found that the technique has particular usefulness in the following fields: food preparation and preservation, seed germination and growth, and medical treatment and research. It is believed that the present invention will also find usefullness in other areas, wherever it is desired to treat or affect the cells of a cellular substance as contemplated herein. However, in order to facilitate an understanding of the present invention, the discussion that follows will be centered principally on the fields mentioned above.

In the preparation of animal and plant food products, man has, from the beginning of time, sought and has, in fact, developed many different and useful techniques in the preparation of food. The discovery of fire gave man the ability to cook foods to enhance the eating thereof. It was also learned that herbs and spices, added as ingredients, could produce different flavoring and tastes in foods. With this knowledge, man created many different types and kinds of food dishes from animal and plant food products which were indigenous to his geographical location.

For thorough flavoring of foods, man learned that good results could be achieved by placing food in a marinating liquid for a predetermined period to impart the flavor of the marinating liquid in the food. While this technique has been successful in imparting the desired flavoring to certain kinds of food products, it has been used to only a limited extent since the time required for marination and proper impregnation of the liquid in various food products could not be practically achieved. Vacuum and/or pressure techniques for liquid penetration of the food products have been suggested to shorten the time for marination, but this was not the only factor involved in marination. The developers of the vacuum and/or pressure techniques soon learned or at least were puzzled by the fact that proper impregnation of foods could not be achieved simply by speeding up liquid penetration of the food product. As a result, flavoring of foods by marination today is achieved by imperfect methods requiring long periods of time and accidental selection of the proper ingredients under conditions that may provide only partial marination of some food products.

It is not specifically known how ancient man tenderized his meat, if at all, prior to cooking and eating, but it is conveivable that he probably would have mechanically worked a tough piece of meat by pounding it in order to make it tender. In modern tenderizing of animal food products such as meat, the techniques have ranged from the injection of a chemical tenderizing compound into animals prior to the slaughter thereof to the application of a chemical substance to the meat product just prior to cooking thereof. As yet, no practical modern day process has been developed for tenderizing meat without the use of chemicals.

There is also no practical method for flushing or washing a plant food product such as an onion to remove some of the strong liquid juices and gases therein which make it difficult to eat and digest without noticeable gastronomical effects.

The preservation of food, in addition to the food preparation techniques discussed above, has also been known from the earliest times. Some historians have suggested that the cave man learned to smoke meat in order to preserve it for the lean months. The ancient Egyptians knew that adding salt to fish or meat would keep it from spoiling. In addition to preservation by smoking and the use of salt, centuries-old techniques have included the use of sugar, hot spices, vinegar and brine to preserve food. These preservation methods are still in use today, but there are also the modern scientific processes of canning, freezing and dehydration which are used on a large scale all over the world.

At the present time, it is not possible to preserve certain foods in their natural state for any great length of time without causing deterioration as well as losing the flavor of the food. For example, plant food products such as the tomato and banana are incapable of being preserved in their original or natural state by either the centuries-old or modern preservation processes without materially impairing the flavor or texture of the product. While it is known that microorganisms and enzymes cause food spoilage or deterioration, it has not been possible, by the known preservation techniques, to prevent deterioration or spoilage which has a marked effect on the food flavor and quality; and thus practically achieve stability of such food products.

The present invention, while being directed to new techniques and processes for preparation and preservation of animal and plant food products, is also related to treatment of edible and non-edible plant products, such as plant seeds and bulbs, to speed the germination and enhance the growth thereof. Early germination of plant products, which is independent of particular soil or weather conditions throughout the world, can have an important effect on plant growth, cultivation and yield. Further, stimulated plant growth will produce faster plant development and increased plant yields in the same or shorter growing periods.

It has also been discovered that the present invention has usefulness in the medical treatment and research field where biochemical and bioelectronic techniques are employed.

Accordingly, it is an object of the present invention to provide a method and apparatus for the treatment of cellular substances.

Another object of the present invention is to provide a new and improved technique for rapid liquid or gaseous impregnation of cellular substances.

A further object of the present invention is to provide a new and improved technique for tenderizing cellular substances, particularly animal food products.

A still further object of the present invention is to provide a new and improved process for preserving cellular substances, particularly plant food products which tend to spoil or deteriorate quickly, in order to retain the original flavor and/or texture thereof.

Still another object of the present invention is to provide a new and improved method for flushing or washing certain plant food products which have an undesirable effect on humans during preparation or consumption thereof.

Yet another object of the present invention is to provide a new and improved process for treating plant products to accelerate the germination and stimulate the growth thereof.

A still further object of the present invention is to provide new and improved techniques which aids in medical treatment and facilitate medical research.

These and other objects and advantages of the present invention are attained by a method and/or apparatus which utilizes reduced pressure and temperature control for treating cellular substances to provide liquid or gaseous penetration or impregnation, tenderizing or flushing of the cellular substance or preservation of the cellular substance by freezing or by gaseous impregnation thereof.

BRIEF DESCRIPTION OF THE DRAWING

FIG. 1 is an exploded perspective view of one type of apparatus which can be used in following the procedural steps related to the method of the present invention;

FIG. 2 is a perspective view of the apparatus shown in FIG. 1 along with a vacuum pump and vacuum pressure indicator used in conjunction with the apparatus;

FIG. 3 is an enlarged perspective view of the vacuum pressure indicator illustrated in FIG. 2;

FIG. 4 is a bottom perspective view of the vacuum pressure indicator shown in FIG. 3; and FIG. 5 is a top plan view of the vacuum pressure indicator illustrated in FIG. 3-4.

DESCRIPTION OF THE PREFERRED EMBODIMENTS

For the purposes of the discussion that is to follow, the term "cellular substance" is intended to include any edible and/or inedible natural substance such as animal and plant products, synthesized products or human and other animal body parts, each of which have a cellular structure wherein the cells are either joined to one another or have intercellular spaces between cells. Further, it is to be understood that the term "animal product" includes any meat, poultry, seafood and any other related product coming from the animal or marine kingdom; the term "plant product" is intended to cover any fruits, vegetables, grains, seeds, nuts, bulbs, tubers, or any other related product coming from the plant kingdom; and the term "synthesized product" includes any substance produced or manufactured in whole or in part by man.

In order to understand the present invention, it will first be necessary to discuss some background principles wich are related to the present invention.

All cellular substances have a cellular structure where the cell walls or membranes are joined to one another or are separated from each other by intercellular spaces. Cellular substances such as animal or plant products have air or gas in their structure which may be located within the intercellular spaces and sometimes within the cells themselves. Additionally, cellular substances have liquids within the cells and also sometimes within the intercellular spaces as well. These liquids, which may include dissolved gases therein, have a certain water and mineral content which varies for particular cellular substances. As is known, water is universally present in all animal or plant products. In leafy green vegetables, for example, there is 90% or more water, whereas in cooked meat, where some of the water has been drived off, the amount of water is between 50-65%. It will be apparent that the mineral content and other liquids and elements in the cellular substance will determine the exact nature of the liquid in the cellular structure.

In order to treat certain animal and plant products, it is advantageous, as taught by the present invention, to remove at least some of the liquid and/or dissolved gases within the liquid from the cellular substance. Specifically, removal of liquid from the cellular substance is achieved by a combination of reduced pressure and temperature control in order to cause vaporized liquid and/or dissolved gases to be released from the cellular substance. Prior art treatment of cellular substances has dealt solely with the removal of air or gas from the cells and between the cells in the cellular substance, as compared with the vaporization of the liquid and/or removal of dissolved gases in the liquid from the cellular substance as is contemplated by the present invention.

After the liquid and/or dissolved gas has been removed, in whole or in part, another liquid having a specific flavor, tenderizing or other desired effect, as will be discussed hereafter, may be introduced into the evacuated spaces of the cells to restore the fluid balance of the cell, but with a different liquid in the cell. This is effectively achieved by immersing the cellular substance in the liquid to be introduced therein during the vacuum and temperature treatment so that when the vacuum is released and normal pressure equilibrium is established, the liquid will be drawn into the cellular substance to restore the liquid balance in the cells thereof. In some cases, such as in freezing of vegetable products, and one form of meat tenderization as is contemplated by the present invention, a liquid is not introduced after vaporization, as will become apparent.

When liquids are removed from the cells of the cellular substance through vaporization, the mineral residue in the cells will remain since they cannot be extracted. In order to remove liquid from within the cell walls, the vaporization of the liquid will either break the cell wall or through osmosis, the vaporized liquid will migrate through the cell wall to the next cell and so on until the vaporized liquid is removed from the various cells of the cellular substance. As the gaseous vapors go through the cell walls or membranes, the weight and volume of each vaporized liquid cell will be reduced. The amount of liquid to be removed can be determined by a combination of vacuum, temperature and time. When the predetermined amount of liquid has been removed by vaporization, it is then possible to add another liquid into the cells of the cellular substance by resuming pressure equilibrium and, at the same time, injecting the desired liquid, such as by pre-immersing the cellular substance in the liquid to be introduced therein. The liquid that is desired to be introduced into the cellular substance first goes into the outer cells which, in turn, feed the inner cells, as the cells of the cellular substance strive to balance when pressure has been equalized. The liquid that is added, therefore, migrates or moves from outer to inner cells for permeation of the cellular substance both within and/or between the cells.

When the cellular substance is immersed in a liquid, the release of vapor and/or dissolved gases, caused by the combination of vacuum and temperature as will be presently described, can be seen in the form of rising bubbles. In such case, when the bubbles have stopped, the liquid is ready to be introduced in the cellular substance.

To determine the conditions of vapor release, attention is invited to the following table:

| VAPOR PRESSURE TABLE FOR DISTILLED WATER | | |
|---|---|---|
| TEMPERATURE DEGREES F. | VAPOR PRESSURE (Inches of Mercury) | VACUUM TO CAUSE BOILING (Inches of Mercury) |
| 212 | 30 | 0 |
| 184 | 16.7 | 13.3 |
| 167 | 11.4 | 18.6 |
| 130 | 4.5 | 25.5 |
| 121 | 3.5 | 26.5 |
| 111 | 2.7 | 27.3 |
| 103 | 2.1 | 27.9 |
| 94 | 1.5 | 28.5 |
| 76 | 1 | 29 |
| 49 | .4 | 29.6 |

It can be seen from the above table that there are two ways of making liquids boil to develop vapor: increase the temperature or lower the pressure. An increase in pressure raises the vaporization point and a decrease, or lowering of pressure, lowers the vaporization point.

Thus, it can be seen from the above table that water will boil at 212° F. under sea level pressure conditions (approximately 30 inches of Mercury), and no vacuum is required to cause boiling of the liquid. Foods can be boiled under such conditions. Where the pressure is reduced, such as at high altitudes, the boiling point is lowered. In such instances, certain cooking processes can be slowed down to a point where foods will not be cooked. For example, if one were to attempt to boil eggs in water at a high altitude, it would be possible to bubble and boil the water in the same way, but the temperature to create the boiling would be so low that the eggs would not be cooked. Pressure cookers are often used to compensate for the low pressure conditions at high altitudes.

This compression of boiling water at sea level and at high altitudes is given for the purpose of understanding the above table in light of the present invention. Under most conditions, the process of the present invention is performed at temperatures substantially lower than 212° F. Accordingly, it is necessary to establish a predetermined vacuum for a given temperature in order to induce boiling and release of vapors from the cellular substance. For example, if the cellular substance were at a temperature of 76° F., a vacuum of 29 inches of mercury would be required in order to induce boiling in distilled water. At 111° F., a vacuum of 27.3 inches of mercury would be required in order to achieve the same result. The above conditions presuppose that the liquid in the cellular substance is distilled water. Obviously, the conditions for vapor release will be determined by the vapor pressure of the liquid in the cellular substance.

In addition to the release of vapor and/or dissolved gases from the cellular substance, it has been found that certain conditions should preferably be observed to keep the cell wall intact or cause the cell wall to be ruptured, depending on the particular treatment that is desired. Where the cell wall is to be left intact, in order to control fluid penetration of the cells and fluid impregnation between the cells where there are spaces between the cells, the vaporization of the cellular liquid and/or removal of dissolved gases should take place under conditions which will cause the liquid to be vaporized and/or dissolved gas removed at a rate which is equal to or less than the vapor transmission rate of the cell walls or membrane. Cellular substances which are chilled or not heated, but are not frozen, will permit vaporization of the cellular liquid in a reduced pressure environment at a slower rate then warm or heated substances. They will allow the vaporized liquid to migrate through its cell wall or membrane while keeping the cell wall intact. Continued migration of the vaporized liquid from cell to cell takes place until the desired amount of liquid is removed from the cellular substance and the desired weight and volume reduction of the cells is achieved.

On the other hand, rupture of cell walls in a cellular substance can be obtained by placing a warm or heated cellular substance in a reduced pressure environment where the combination of temperature and reduced pressure is sufficient to cause the cellular liquid to be vaporized and/or dissolved gases to be removed at a rate greater than the amount of permissible vapor transmission thereby causing the cell wall to be expanded to a point where the cell wall is ruptured.

In order to vaporize a liquid in a cellular substance, the exact conditions to be observed can be obtained empirically by determining the vapor pressure of the cellular liquid and then utilizing temperature and reduced pressure to determine when vapor transmission between cells or cell rupture will occur. The rate of vaporization for a particular cellular substance can be controlled as explained above, by heating or chilling the cellular substance or the fluid around the cellular substance in order to obtain the temperature that is desired.

Where the cellular substance is immersed in a liquid, it is possible to vaporize the cellular liquid without vaporizing the liquid in which the cellular substance is placed by using a temperature differential. Thus, a heated or chilled cellular substance can be placed in a liquid of lower temperature so that the cellular liquid will be vaporized without vaporizing the liquid in which the cellular substance is placed. Also, a difference in the vapor pressure of the cellular liquid and the liquid to be impregnated in the cellular substance can provide vaporization of the cellular liquid only.

In certain instances, the vapor pressure of the cellular liquid, because it is greater than the liquid to be impregnated in the cellular substance, will cause vaporization of the cellular liquid even though the temperature of the surrounding liquid is higher than the cellular liquid. While it would be expected that a surrounding liquid of higher temperature will vaporize before the cellular liquid of a colder cellular substance, this will not be the case where the vapor pressure of the cellular liquid is sufficiently greater than the relatively warmer surrounding liquid to cause vaporization of the cellular liquid. For example, it may be desirable to use a relatively warmer liquid in impregnating vegetables, for example, so that while vaporization of the cellular liquid in the relatively cooler vegetable takes place, the relatively warmer surrounding liquid serves to minimize expansion of the relatively cooler vegetable so as to retain its shape and texture when impregnated with the desired liquid. The relatively warmer surrounding liquid slowly heats the relatively cooler vegetable starting from the outside and working inwardly as vaporization of the cellular substance liquid takes place so as to minimize expansion. This serves as a built-in control for the system and makes it unnecessary to use guages to determine product stability.

In removing liquids and/or dissolved gases from a cellular substance, it has also been discovered that an intermittent or pulsating vacuum or reduced pressure environment can be particularly useful. By releasing and then reestablishing the vacuum, it has been found that treated cellular substances are more completely penetrated in an intermittent or oscillating environment than treated cellular substances in the presence of a continuous vacuum. The intermittent, oscillating or pulsating vacuum provides expansion and release of the cellular substance similar to massaging or kneading it so as to aid in removing liquid and/or dissolved gas. As will be appreciated, the liquid in the outer cells of a cellular substance will first be vaporized and this will progress from the outer to the inner cells during the process. The migration of vaporized liquid from inner to outer cells of the cellular substance, in order to have a more complete penetration of the liquid to be subsequently introduced is greatly enhanced by the intermittent oscillating or pulsating vacuum.

The duration of the vacuum and the number and length of interruptions in the vacuum cycle will be determined by the size of the cellular substance, the amount of liquid to be removed, etc.

The present invention also makes it possible to introduce certain specific elements in a cellular substance which cannot be subsequently extracted, with or without changing the liquid content of the substance. This is possible since it has been discovered that the osmossis rate is different for removing or introducing certain liquids or elements because of what is left in or what can be taken out of the cellular substance. As has been previously mentioned, minerals or nutrients cannot be extracted from the cellular substance; however, it is possible to introduce minerals or nutrients in a liquid carrier into the cells of the cellular substance. The liquid carrier may thereafter by removed by vaporization, in whole or part, depending on the desired liquid content without removing the introduced minerals or nutrients. Thus, in seeds, it is possible to introduce a liquid nutrient in seeds and then vaporize the solvent of the thus introduced liquid nutrient to remove the excess liquid while leaving the nutrient itself in the cells of the cellular substance. As will be appreciated, this treatment will enable seeds to be stored in the usual manner, but when germination and growth are desired, the seeds will be fed by the nutrients that have been placed in the seeds.

Since the process of the present invention involves pre-treatment of cellular substances prior to cooking, freezing and other subsequent treatments, the cellular substance should not be processed in any way which will interfere or prevent the pre-treatment technique of the present invention. Thus, in the case of meat products, for example, the meats should not be heated to a point where the cells become set to prevent fluid impregnation or other subsequent treatments. It has been found that certain meat products should not be heated over 100° fahrenheit in order that the subsequent treatment that is desired will not be affected. Similarly, vegetable products should not be heated to the point where the texture and indentity of the product will be changed. While the precise temperature that changes various cellular substances so as to interfere with the processing of cellular substances as contemplated by the present invention will vary, it will be appreciated that certain pre-conditions should be observed in order to provide the specific processing technique that is desired.

Having now presented some general background information, the present invention will be described in detail.

Apparatus

Reference is now made to FIGS. 1–5 of the drawing for a description of the illustated form of apparatus used in connection with the present invention. As depicted in FIG. 1–2 of the drawing, the apparatus includes a container 10 preferably having a pair of handles 12 on opposite sides thereof for lifting and transporting the container 10, a flange or rim 14 adjacent the open upper end 16 of the container 10, and a gasket 18, in the form of a closed cell rubber or vinyl cell complementarily shaped relative to the container 10 and formed in an L-shaped cross section such that a tubular shaped portion 20 of the gasket 18 fits within the open upper end 16 of the container 10 while the radially directed annular portion 22 of the gasket 18 rests on the rim or flange 14 of the container 10. The cover 24 includes a centrally positioned knob 26 for removing and applying the cover 24 relative to the container 10, a depending skirt portion 28 which is received within the tubular portion 20 of the gasket 18 when the latter is mounted on the container 10, and a hole 30 which is surrounded by a flat area 32 which is configured to receive a vacuum pressure indicator as will be presently described.

The container 10 and cover 24 should be made from implosion proof materials to withstand reduced pressure developed within the container 10 when the cover 24 is applied thereto and both elements are sealed from the outside atmosphere. The cover 24, in addition to being implosion proof, should be transparent to permit viewing within the conpainer 10. The gasket 18 serves as a sealing means between the container 10 and cover 24 to seal off the container with cover from the outside atmosphere. Such a seal is important in order to permit reduced pressure to be established within the container 10.

In order to establish reduced pressure within the container 10 when the cover 24 is applied thereon, a vacuum source 34 is provided. The vacuum source 34, may be either an electric or water vacuum pump or other suitable source as may be desired. The vacuum source 34 is connected by a suitable line 36 to a vacuum pressure indicator 39 which is mounted on the flat area 32 of the cover 24. The vacuum pressure indicator contains suitable controls, as will be presently described, for reading or releasing the vacuum that is desired.

The vacuum pressure indicator 38 is best depicted in FIG. 3–5 of the drawing. The vacuum pressure indicator 38 is complementary configured relative to the flat area 32 of the cover 24 and includes a gasket element 40 on the lower surface thereof to prevent any air leaks between the cover 24 and the vacuum pressure indicator 38. When the reduced pressure is established within the container, the gasket element 40 of the indicator 38 will be drawn into tight contacting engagement relative to the flat surface 32 to accomplish this purpose.

The vacuum pressure indicator 38 has a centrally located tubular extension 42 also extending from the lower surface thereof, as best seen in FIG. 4, which is adapted to be inserted within the hole or opening 30 formed in the cover 24. The tubular extension 42 is connected by suitable passageways, as will presently be discussed, to the fitment 44 which extends from one end of the vacuum pressure indicator 38. The fitment 44 is adapted to telescopically receive thereupon the line 36 which connects the vacuum pressure indicator 38 to the vacuum source 34.

In order to turn on and off the vacuum between the vacuum source 34 and the container 10, a valve 46 with operating lever 48 is provided. As best seen in FIG. 5 of the drawing, the valve is located in a passageway 50 which connects the tubular extension 42 and the fitment 44. When the valve is turned to its open position, the vacuum source 34 is then connected to the container 10 for the purpose of establishing a vacuum therein. Turning the valve 46, through the operating lever 48, to its closed position limits the vacuum that is establihsed in the container 10. Generally, the vacuum is turned off when the vacuum pressure gauge 52 indicates that a predetermined reduced pressure has been established. The reduced pressure is maintained for a predetermined time period, in accordance with the processing of the cellular substance within the container 10, and when it is desired to release the reduced pressure and equalize the pressure within and without the container 10, the release valve 54 is opened by its operating lever 56 to permit the container 10 to be connected through the passageway 58 to the outside atmosphere. Air will quickly enter through the passageway 58 reestablishing equilibrium pressure conditions within and without the container 10.

The strength and duration of the reduced pressure and the time involved in reestablishing equilibrium pressure conditions is predetermined by the cellular substance and the liquids, as will be discussed hereafter.

The apparatus shown in the drawing is illustrative of the type of components that are generally necessary in performing the process of the present invention. It will be understood that many variations of the illustrated apparatus are possible. The shape and size of the container 10, gasket 18 and cover 24 may be varied to suit the particulars desired. The container 10 may be provided with one or more compartments or separate containers in order to permit a number of different cellular organic substances to be processed at the same time. Under certain circumstances, a weighted grill may be desired since there is a tendency of some cellular organic substances to float. In lieu of the gasket 18, one or more O-rings may be provided in either the container 10 or cover 24 to serve the same function as the gasket 18, namely as a sealing means to seal off the container 10 and cover 24 from the outside atmosphere when assembled together. Also, a timing mechanism (not shown) which is connected to the valves 46, 54 in order to obtain an automatic pulsating or intermittent reduced pressure effect may be usefully employed.

Another way in which an intermittent oscillating or pulsating vacuum can be provided is to reduce the pressure to a given point, turn off the vacuum, and then maintain the reduced pressure at the given point. As the vapor increases the gas or fluids in the space of the container, the bubbles will reduce. After a predetermined time interval, the vacuum pump can be restarted and this will have the effect of producing an increased reduced pressure over what had been established before. Each time this cycle is repeated a gradually increasing reduced pressure environment will be created. For automatic operation, a timing control mechanism (not shown) which is connected to the valves 46 and 54 and vacuum source 34 may be provided.

The vacuum pressure indicator 38 may be mounted integrally within the cover 24 or may be mounted on the vacuum source 34. It is also conceivable that the vacuum source 34 can itself be mounted on the cover 24 in a suitable fashion so that the indicator 38 and the vacuum source 34 are both mounted on the cover 24.

Other variations in the apparatus will no doubt be apparent to those skilled in the art. Also, in light of the foregoing description, the structure and function of the apparatus in performing the various processes of the present invention will be apparent.

The various processes of the present invention which can be performed by the apparatus shown in the drawing or equivalent apparatus will now be described.

Fluid Impregnation Process

In order to introduce or impregnate fluids in a cellular substance such as an edible animal or plant product, a reduced pressure should be established in the container 10 from the vacuum source 34 which is of sufficient strength and duration to release vapors and/or dissolved gases from the cellular structure of the cellular substance. The liquid that is removed from the cellular substance by the escaping vapors or dissolved gases can be replaced by an equivalent amount of fluid. This is achieved by introducing air in the container 10 such as through the passageway 58 when the cellular substance is immersed in a liquid that is to be impregnated therein.

The amount of reduced pressure that is developed within the container in order to release vapor and/or dissolved gases from within the cellular structure of the cellular substance will have been predetermined by empirical testing. The length or duration of the reduced pressure will also have been predetermined. The time that is involved in order to achieve sufficient vapor and/or dissolved gas release can be used to generally determine the amount of time that the cellular substance is allowed to remain within the liquid or be subject to gaseous treatment. It has been found that a satisfactory permeation or saturation of the fluid within the cellular substance is achieved when the cellular substance remains in the liquid for a period of time preferably at least twice the time that it was subjected to reduced pressure.

When a cellular substance is immersed in a liquid, it is easy to determine when the reduced pressure should be released and pressure equalized within and without the container. The vapors and/or dissolved gases released from the cellular substance take the form of bubbles in the liquid, and by viewing the cessation of the bubbling through the transparent cover 24, it is generally the case that sufficient vapor and/or dissolved gas release has occurred to permit sufficient permeation or penetration of the liquid within the cellular substance when pressure is equalized within and without the container. Again, the cellular substance preferably should remain in the liquid for at least twice the duration of the reduced pressure for proper permeation or penetration of the liquid within the cellular substance.

Whenever a gas is to be injected in the cellular substance, such as a gaseous hickory smoke flavor for meat, it is not possible to visually determine the escaping vapors from the cellular substance. However, suitable instrumentation may be employed to determine when the vapors have escaped from the cellular substance.

The following examples are intended to more clearly define and illustrate the process of liquid impregnation:

EXAMPLE 1

Boneless pot roast was pre-warmed in an oven to approximately 84° F. The pot roast was then placed in a container with a lemon-oil marinade, the marinade being at room temperature (approximately 70° F.). A vacuum was established until bubbling ceased in the marinade, at which point pressure equalization within and without the container was established with the pot roast remaining in the marinade for a period of time at least twice the duration of the bubbling in the marinade. The pot roast was removed from the marinade and cooked in a conventional manner. The pot roast prepared in this manner was not only tasty, it had a definite lemon-oil flavoring throughout.

EXAMPLE 2

Chicken was pre-warmed in an oven to approximately 85° F. the chicken was placed in a sweet-sour marinade which was at room temperature (approximately 70° F.). The chicken was then processed normally in the unit, by the establishment and release of reduced pressure to introduce the sweet-sour marinade in the chicken. Thereafter, the chicken was removed from the marinade and cooked in a conventional manner. Upon eating, it was determined that the chicken was flavored with a sweet-sour flavoring throughout and was more tender.

EXAMPLE 3

Pork spare ribs were pre-warmed to approximately 80° F. and placed in room temperature (70° F.) sauerkraut juice in the processing unit and processed normally. The ribs were removed from the unit and then cooked. After cooking, the ribs were eaten, it being noticed that the ribs had obtained a pronounced sauerkraut flavoring including juice in the bone.

EXAMPLE 4

Apples and pears, at a temperature of approximately 55° F., were cooked and then submerged in a strawberry "Jello" liquid in the processing unit. The liquid "Jello" had a temperature of approximately 115 degrees F. A reduced pressure was then established in the processing unit until the bubbling from the apples and pears in the "Jello" liquid ceased. The pressure within the container was then equalized with the outside atmosphere causing penetration of the "Jello" liquid in the apples and pears. The apples and pears were allowed to remain in the "Jello" liquid for twice the duration of the reduced pressure. When the apples and pears were removed from the unit and eaten, it was determined that a strawberry flavoring had been imparted thereto. Prior to eating, the apples and pears exhibited a strawberry coloring throughout.

EXAMPLE 5

Cherry tomatoes, at 55° F., were perforated with several small holes at each end. They were then placed in a gin bath of 70° F. and processed in accordance with the present invention. It was noted that a definite gin taste had been imparted to the cherry tomatoes when eaten.

It can be seen from the above examples that the fluid impregnation process of the present invention is useful in imparting distinctive flavorings to animal and plant products.

In some of the examples described above, the cellular substance was heated while in others the cellular substance was chilled. Vaporization of cellular liquid and/or removal of dissolved gases then took place under conditions where the cell structure was perhaps either ruptured or was left in tact. Where marination of certain food products such as meat is concerned, it may be desirable to rupture the cell walls to provide a "tenderizing effect" while removing cellular liquid by vaporization, and then replacing the vaporized cellular liquid with a marinating liquid when pressure equilibrium is re-established. This will depend on the grade of meat, its toughness, etc. along with the treatment that is desired to be achieved. Thus, instead of rupturing cell walls in meat products, it may be desirable to remove vaporized liquid and/or dissolved gases from the cell walls while leaving the cell walls intact for subsequent introduction of a marinating liquid in the product. The same concept of keeping the cell walls intact or rupturing the cell walls applies to plant products, depending on what is desired.

Tenderizing Process

While tenderizing of animal products such as meat can be accomplished at least in part, through marination or liquid impregnation as described above, there are two additional tenderization techniques made possible by the present invention.

One technique which is related to the liquid impregnation technique described above involves the impregnation of a tenderizer into the meat cells following vaporization of at least some of the liquid and/or removal of the dissolved gas from the meat cells, according to the process of the present invention. In this instance, the meat cells can either be ruptured or can be left intact. In either case, substantially uniform distribution of the enzyme will be achieved in a short time interval, thus making the technique adaptable to meat packers, retail meat distributors, restaurants and households. It will be apparent that the amount of enzyme concentration and the period of treatment should be controlled to avoid overtenderization of the meat.

The other meat tenderizing technique with which the present invention is concerned is the tenderizing of meat without any liquid impregnation. This technique can be accomplished by following the procedure set forth in the following example:

EXAMPLE

Tenderizing meat can be achieved by pre-warming the meat to a temperature in the range of 80° F. to 100° F. The pre-warmed meat is then placed in the processing unit, and the maximum reduced pressure (approximately 29 to 29.5 inches of mercury) is created. This will cause the meat to expand beyond its original size while vaporization of the liquids within the meat takes place so as to cause cell rupture. Also by holding the meat extended for a predetermined period of time, the extension can break down fibers in the meat, thus aiding in the tenderizing of the meat. Upon release of the reduced pressure, the meat will return to its original size. In some cases, a very small amount of residual expansion of the meat can be noticed.

The example given above concerning the temperature of the meat, the amount of reduced pressure and the time period during which the meat is left extended is given for exemplary purposes only, it being understood that the tenderizing process requires only that the meat have a predetermined temperature at which it is subjected to reduced pressure treatment for a predetermined time period to cause vapor release of at least some of the liquid and/or removal of dissolved gas from the cells of the meat which results in a beneficial tenderizing effect. In addition to vapor and/or dissolved gas release, cell rupture can be used to aid in the tenderizing of the meat where the temperature and reduced pressure are combined to achieve this.

It can thus be seen that the tenderizing process does not require the use of any chemicals, but rather the combination of temperature, reduced pressure and time as set forth above to achieve the desired result.

Preservation Process

While there are a number of centuries-old and modern-day preservation techniques which have been usefully employed for many different food products, it has not been possible to preserve certain foods in their natural state for any great length of time without losing the flavor of the food. Examples of this are the tomato and banana which are generally incapable of being maintained by any known preservation process without materially impairing the flavor or texture of the product when one attempts to bring it back to its original or natural state.

Spoilage of foods, and resulting loss of time, is due to a combination of microorganisms and enzymes in food products which, unless stopped, will cause rapid food deterioration.

According to the present invention, it is possible to preserve food products such as tomatoes, bananas and other animal and plant products so that when they are returned to their original condition, the products will not be broken down from a taste, flavor or texture standpoint as is the case with known preservation techniques.

In order to process products such as tomatoes or bananas where a skin fluid impervious covers the product, it is beneficial to provide at least one opening in the product, preferably a number of small openings on opposite sides of the product. During processing of tomatoes and bananas thus prepared in a processing unit as will be presently described, the temperature of the product is preferably just above freezing (approximately 33° to 40° F). The products can be brought to this temperature either prior to or after preparation of openings therein, as will be apparent.

The products to be preserved are then placed in the processing unit and a reduced pressure is created therein to vaporize at least some of the liquid in the cell structure of the product. When this is accomplished, the processing unit with the products contained therein is placed in a freezing unit for the purpose of freezing the products that have been processed. Once frozen, the vacuum is released and the food products are preferably removed from the processing unit and maintained in a frozen condition until ready for consumption.

It has been found that food products such as tomatoes and bananas when preserved in this manner maintain the fresh fruit flavor and taste when thawed. As compared with other preservation techniques, the fresh fruit flavor, taste and texture of the products were not broken down by the preservation process.

By empirical methods, the amount of liquid to be removed by varporization can be determined so that when the product is frozen, the expansion that occurs will not damage the cell wall or membrane in order to retain the texture and structural integrity of the product.

In lieu of freezing the product, gaseous preservatives have been used after the reduced pressure has been drawn and gas is removed from the cell structure of the product. Specifically, in a product such as a musk melon, it is possible to replace the gas inside with an inert gas such as nitrogen. Such a fluid preservative will retard the spoilage caused by microorganisms and enzymes in the product to extend its shelf life. To avoid escape of the nitrogen gas, an overwrap seal can be applied over the outer skin of the product to contain the nitrogen gas therein. The use of fluid preservatives such as nitrogen in preserving plant products is not limited to products such as the musk melon; rather, it can be used on a wide variety of plant food products. It will be noted, however, that vaporization of cellular liquid is not required where gas inside of the product is to be replaced with an inert gas. When cellular liquids are vaporized, they can be replaced with a gaseous preservative, providing that the cell structure is not ruptured.

Flushing Process

Some food products such as the onion and radish have undesirable taste characteristics in that they can be quite harsh when eaten. The onion particularly may develop adverse gastronomical effects when consumed. Additionally, a product such as an onion is difficult to slice for serving purposes without "bringing tears" to the eyes of the one preparing the onion. In addition to plant products, animal products such as wild game exhibit a strong taste which can be unappetizing.

According to the present invention, both plant and animal products can be flushed or washed of undesirable liquids or gases contained therein to enhance the preparation and eating of such food products. The flushing process is achieved by first placing the food product in a flushing liquid within a container. Once placed in the container, the contents are sealed off from the outside atmosphere, in accordance with the techniques herein disclosed, and a reduced pressure is created within the container of sufficient strength and duration to remove at least some of the undesirable liquid or gas from the food product. Thereafter, the pressure is equalized within and without the container to cause the flushing liquid to penetrate the cellular structure of the food product. In order to obtain flushing or washing of the interior of the product, it may be desirable to repeat the steps of creating the reduced pressure and equalizing the pressure within and without the container in a cyclic manner to remove more of the undesirable fluid from the product during the process.

Tests which were conducted with products such as onions, radishes, and wild game in accordance with the above procedure, have shown that it is possible to give such products a milder taste and thus render them more palatable than is presently possible.

Fertilization Process

The present invention has heretofore been described in connection with edible animal and plant food products. The present invention also has application in connection with plant seeds, bulbs, and the like. In particular, it has been found that it is possible to speed the germination and stimulate the growth of seeds, bulbs and the like by following the procedure that is to be presently described.

The use of liquid or solid nutrients to stimulate the growth of seeds, bulbs and the like is presently limited to certain time periods. Specifically, it is only after germination has been started that application of fertilizer can be useful to stimulate plant growth. As is known, there are certain physiological mechanisms commonly known as "blocks" which restrict germination. Thus, until the "blocks" are removed, fertilizer application is of little value.

Germination "blocks" are of two types, namely, physical blocks which are caused by structure surrounding the embryo and chemical blocks which have inhibiting chemicals in tissues or cells of the seeds and/or inhibitors within the seed embryo itself. The seed coat and surrounding membranes primarily act to protect the seed embryo from mechanical damage and from attack by micro-organisms; however, these structures also act as germination blocks by preventing the entry of water and/or oxygen in certain seeds.

In so far as chemical blocks are concerned, the tissues or cells surrounding the embryo may contain certain chemical inhibitors while the embryo itself may contain growth-inhibiting chemicals or have a deficiency in some essential compound required for germination. While the precise nature of chemical blocks for various seeds has not been determined, it is known that some form of growth-inhibiting chemicals restrict or prevent germination until the proper conditions for seed germination are present.

Nature requires each kind of seed to absorb a fairly definite proportion of water before germination will start; however, too much water, except in certain kinds of seed which will germinate in water, can cause restriction of respiration of the seed as well as produce abnormal development of the seed. Also, chemical inhibitors in certain seeds enforce dormancy until water leeches out the inhibitors. It will be appreciated that nature's germination process, in addition to the proper amount of water, requires a definite period of time and certain temperature and light conditions, for overcoming the germination blocks. The proper amount of water, time, temperature and light will vary with the many types of seeds that are available.

In order to cause germination to occur at time periods other than the natural combination of time and exposure to the elements, some of the commonly used treatments for overcoming the dormancy or "blocks" in seeds have included soaking the seeds in water, prechilling the seeds, the use of low-high alternating temperatures, moistening the seed substrata with a dilute solution of potassium nitrate and pre-drying seeds. While the above artificial techniques have produced random germination of certain types of seeds, germination has not been controlled onaa consistent basis. Also, the above artificial techniques have independently removed certain germination blocks; however, where the blocks are interdependent, germination has not been successful.

According to the present invention, germination and stimulated growth of seeds, bulbs, and the like is enhanced by removing the physical and/or chemical blocks to germination so as to cause germination, followed by stimulated growth, to occur for many different types of seeds, bulbs and the like. The process of the present invention also allows interdependent blocks to be removed so as to provide alternate pathways to germination in a manner that heretofore has not been possible, as will become apparent.

In order to remove physical and/or chemical blocks to germination, the seed cells are treated so as to remove cellular liquid from at least some of the cells and/or add a predetermined quantity of liquid to the cells, while keeping the cellular walls intact. Cellular liquid may be removed depending on the quantity of water in the seeds and the chemical inhibitors that may be contained in the cellular liquid. As is known, the quantity of liquid in a seed drops rapidly as a seed reaches maturity and is shed from the plant. In lieu of or in addition to removal of cellular liquid, a predetermined quantity of liquid can be added to the seed to dilute or overcome chemical inhibitors in the seed that may enforce dormancy.

Where seeds have a high liquid content, such as when seeds have just reached maturity, some of the cellular liquid may be vaporized prior to the introduction of the liquid nutrient. Where, on the other hand, the seeds have a low liquid content, such as where they have been stored for a long period of time, a predetermined quantity of liquid can be added to overcome chemical inhibitors by dilution rather than by vaporization. Empirical testing will determine the condition under which either the vaporization or dilution technique or both will be used for particular seeds.

The removal of cellular liquid and/or the addition of a predetermined quantity of liquid to seeds can be accomplished by utilizing a reduced pressure of sufficient strength and duration, along with temperature control, while the seeds are submerged in a liquid bath. Where cellular liquid is to be removed, cellular liquid can be vaporized and/or the dissolved gas therein removed under conditions which will keep the cell wall intact for subsequent introduction of fluid nutrient. As pointed out above, the liquid vaporization and/or dissolved gas removal should take place under conditions where the rate of removal is equal to or less than the vapor transmission rate of the cell walls to avoid destruction thereof. This can be achieved by chilling the seeds to a temperature where the vaporized liquid and/or dissolved gas will migrate through the cell walls or membrane while keeping the cell walls intact. After removal of a predetermined quantity of cellular liquid and/or dissolved gas, a liquid nutrient can be introduced when the vacuum is removed and pressure equilibrium is obtained. This is easily accomplished since the seeds are preferably in a liquid nutrient bath when the seeds are subjected to a combination of reduced pressure temperature. As will be appreciated, it is possible to introduce a predetermined quantity of liquid nutrient on a percentage of weight basis which will be determined by the rate of introduction of the liquid nutrient into the seeds. Thus, the proper amount of liquid nutrient for a given seed variety can be controlled for proper germination.

In carrying out the fertilization process of the present invention, whether vaporization and/or dilution techniques are utilized, the following precedural steps are employed. The seeds to be treated should preferably be subjected to treatment which will place them in a dormant state, if they are not already in that condition. Chilling, in the vicinity of 40°–45° F, may be beneficial where vaporization and/or dissolved gas extraction rate can be slowed down in order to allow vaporization liquid and/or dissolved gas to migrate from cell wall to cell wall until it is removed from the seeds without destroying the cellular wall structure of the seeds. The chilled seeds are deposited in a liquid nutrient bath of higher temperature, preferably in the vicinity of 70°–75° F. and then subjected to reduced pressure treatment.

When chilled seeds are placed in a warmer liquid nutrient bath and subjected to reduced pressure treatment, which is subsequently released in order that the proper amount of liquid nutrient penetrates or permeates the seeds, the physical and/or chemical blocks to germination appear to be removed so as to allow treated seeds to germinate and grow faster than untreated seeds. Very favorable results have been achieved in impregnating a liquid nutrient according to the above process and then planting treated seeds in soil for growth. From the tests that have been conducted, it has been determined that the process of the present invention greatly enhances germination and stimulates the growth of seeds and the resulting plants.

Where germination and growth of seeds is not immediately desired, a liquid nutrient can be impregnated in the seeds according to the above procedure, and then the liquid nutrient can be vaporized by reduced pressure treatment and temperature control so as to allow the solvent of the introduced liquid to be vaporized while leaving the nutrient in the cells of the seeds. The amount of liquid to be removed by vaporization will be sufficient to prevent activation of the germination process. Seeds so treated can be stored in the usual manner, but when germination and growth are desired, the seeds can be fed by the nutrients that have been placed in the seeds. The liquid nutrient, in addition to stimulating plant growth, may also include insecticides and herbicides, as will be apparent.

Reference is now made to the following examples which are intended to more clearly define and illustrate the fertilization process of the present invention.

EXAMPLE 1

A variety of vegetables and flower seeds (40° to 45° F.) were placed in a nutrient solution (70° to 72° F.) within the processing apparatus. A vacuum of 28 inches of mercury was established for approximately twenty minutes followed by pressure equalization. Seeds so treated were planted in the ground the same day. The next day, the seeds had begun to germinate. Within one week, plant growth from the flower seeds had reached a height of 10–12 inches while plant growth from the vegetable seeds was approximately 4–6 inches in height. All of the plants exhibited excellent leaf development within this period of time.

EXAMPLE 2

Sweet corn seeds (40°–45° F.) were placed in a liquid nutrient solution (70°–75° F.) in the processing unit. A reduced pressure approximately 28.5 to 29.5 inches of mercury was drawn for approximately fifteen minutes, and then pressure equilibrium was reestablished with the corn seeds remaining in the liquid nutrient for a predetermined time to assure penetration or saturation of the liquid. The thus treated sweet corn seeds were planted adjacent a row of untreated seeds after planting revealed that the treated seeds had germinated much earlier than the untreated seeds and had begun to row at a much faster rate. The plants growing from the untreated corn seeds reached a typical height of 6–8 feet with normal yields while the plants growing from the treated corn seeds grew to a height of 10–12 feet with above normal yields. Most of the stalks from the treated seeds yielded the normal number of ears; however, some stalks yielded double cobs in the corn ears.

From the above examples, it will be seen that the process of the present invention substantially lessens germination time while stimulating plant growth.

Other Applications

It is comtemplated that the process of the present invention can be used for biochemical and bioelectronic treatment and research. As pointed out above, cell walls can be ruptured or kept in tact by causing cellular liquid to be vaporized and/or dissolved gases to be removed which is relative to the amount of permissible vapor transmission.

It is believed that controlling fluid penetration between cells and/or rupturing cells in selected areas of living body parts can be usefully employed for skin reconditioning, body treatment and healing purposes. Experimentation will be necessary to establish the perameters of the process for biochemical and bioelectronic purposes.

It has been discovered that clothes stains can be removed by placing the article to be treated in a processing unit with water or selected chemicals and then utilizing a reduced pressure coupled with temperature control to produce mixing and agitation of the articles for removing dirt and stains from the fabric. The bottom of the clothes washer can be heated while the pressure is reduced to produce the desired agitation. Furthermore, a pulsating or intermittent vacuum can be useful in drawing the washing liquid through the fibers. Excess washing liquid can be spun off and/or vaporized to remove the washing liquid in the tub as well as any liquid that clings to the fabric.

In addition to the actual and contemplated application of the herein disclosed technique, it will be apparent that there will be useful applications other than these specifically mentioned herein.

From the foregoing, it will be appreciated that the present invention suggests new and useful techniques for animal and plant processing which can be utilized in the food preparation, food preservation, plant growth and related industries as well as processing of other articles. The numerous applications of the present invention make it desirable for use in the home, food store, restaurant, and the like from a food preparation and preservation standpoint, in addition to various plant growth applications such as food and flower production. The present invention is also useful in skin treatment for humans, medical and/or surgical procedures and other areas where it is desired to treat or affect the cells and/or liquid within or between the cells of a cellular substance.

I claim:
1. A method of processing an unfrozen cellular substance having rupturable but unruptured cell walls containing cellular liquid, comprising the steps of vaporizing at least some of the cellular liquid in said unfrozen cellular substance by a combination of reduced pressure and temperature control at a rate which is not greater than the vapor transmission rate of said rupturable cell walls of the cellular substance in order to remove vaporized cellular liquid while keeping the cell walls intact, providing a pulsating reduced pressure of gradually increasing intensity during the vaporization by terminating without releasing the reduced pressure for a predetermined time interval, and then increasing the level of reduced pressure a predetermined number of times and thereafter introducing another liquid different from the cellular liquid in the cellular substance in place of the cellular liquid replaced therefrom.

2. The method as defined in claim 1 wherein the cellular substance is chilled prior to vaporization to a degree sufficient to cause cellular liquid to be vaporized at a rate not greater than the vapor transmission rate of the cell walls of the cellular substance.

3. The method as defined in claim 1 including the steps of placing the cellular substance in a liquid bath different than that of the cellular liquid in the cellular substance, vaporizing at least some of the cellular liquid in the cellular substance without vaporizing the liquid in the liquid bath, and introducing the liquid from the liquid bath in place of the cellular liquid vaporized from the cellular substance.

* * * * *